United States Patent [19]
Stöhr

[11] Patent Number: 5,743,166
[45] Date of Patent: Apr. 28, 1998

[54] BELLOWS

[76] Inventor: Albert Stöhr, Am Wiedenberg 8, 85570 Markt Schwaben, Germany

[21] Appl. No.: 642,353

[22] Filed: May 3, 1996

[30] Foreign Application Priority Data

May 11, 1995 [DE] Germany .................. 295 07 800.6

[51] Int. Cl.$^6$ .................. F01B 19/00; F16J 3/00
[52] U.S. Cl. .................. 92/42; 92/45; 92/47
[58] Field of Search .................. 92/34, 42, 45, 92/47

[56] References Cited

U.S. PATENT DOCUMENTS

| | | | |
|---|---|---|---|
| 2,145,937 | 2/1939 | Lockwood | 92/45 X |
| 2,347,185 | 4/1944 | Fentress | 92/45 X |
| 3,831,499 | 8/1974 | Andrews et al. | 92/45 |
| 4,325,769 | 4/1982 | Moyse et al. | 92/34 X |
| 4,457,213 | 7/1984 | Morgan | 92/42 |
| 4,579,045 | 4/1986 | Tominaga | 92/42 |
| 4,638,722 | 1/1987 | Schneider et al. | 92/42 |
| 5,261,317 | 11/1993 | Fraser, Jr. | 92/42 |

FOREIGN PATENT DOCUMENTS

| | | |
|---|---|---|
| 32 25 369 | 1/1989 | Germany . |
| 37 40 584 | 7/1989 | Germany . |

*Primary Examiner*—Hoang Nguyen
*Attorney, Agent, or Firm*—Thomas, Kayden, Horstemeyer & Risley

[57] ABSTRACT

The invention relates to a bellows, in the bellows body of which are provided supporting frames which are welded to the outer pleats of the bellows body. The connection between the outer pleats of the bellows body and the supporting frames is formed by a high-frequency welded joint. The bellows according to the invention can be produced in a particularly economical manner and, if required, the bellows body can also be coated with PVC if the supporting frames—as usual—are produced from rigid PVC.

7 Claims, 1 Drawing Sheet

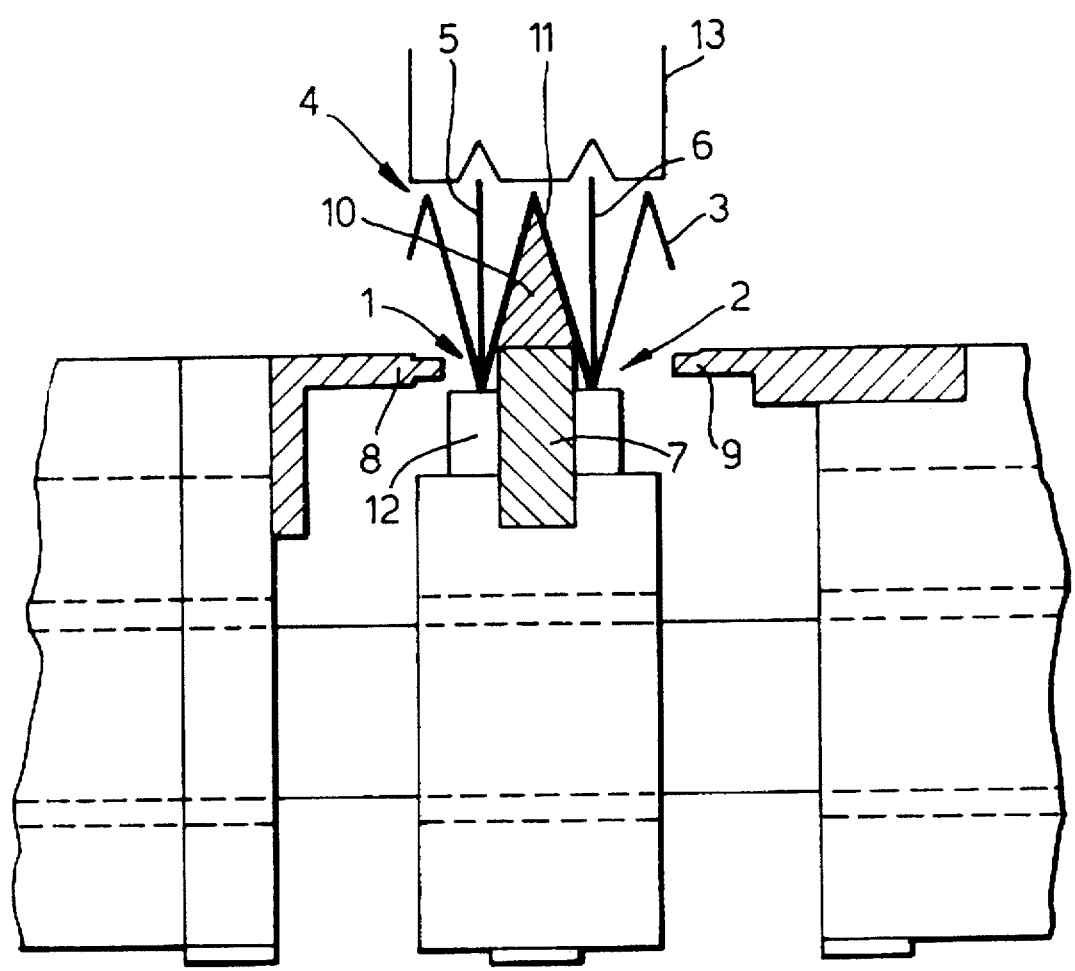

BELLOWS

FIELD OF THE INVENTION

The invention relates to a bellows, in the bellows body of which are provided supporting frames which are welded to the outer pleats of the bellows body.

The invention further relates to an apparatus for welding the outer pleats of the bellows body of a bellows to supporting frames disposed in these outer pleats.

BACKGROUND OF THE INVENTION

There has long been known in the art a method of producing bellows in which the outer pleats are welded to the supporting frames located therebetween by welding dies which are applied laterally to the outer pleats and can be pressed together in the longitudinal direction of the bellows. In this case the outer pleats are each welded individually, i.e. one pleat after the other, to the supporting frames. The welding dies which are applied laterally to the outer pleats do indeed produce a reliable welded joint, but this way of producing bellows necessitates considerable expenditure of resources.

A method of producing bellows is also known from DE-C-32 25 369, in which the supporting frames are jointly pressed from the interior into the outer pleats against an outer abutment formed by a heating plate. In this case a plurality of outer pleats are heated and welded to the supporting frames disposed therein.

However, such a method has the disadvantage that, particularly in the case of thin-walled supporting frames, the welded joint is frequently unsatisfactory between the supporting frames which are pushed from the interior, i.e. with a narrow end face, into the outer pleats and the bellows material. It is a further disadvantage that using this known method it is only possible to weld a bellows material coated with polyurethane (PU), but not a PVC-coated bellows material, since in view of the positioning of the pleats close together which is necessary with this method PVC-coated pleats would be welded not only to the PVC supporting frame but also to one another.

It is also known from DE-C-37 40 584 for the bellows bodies of bellows to be welded to supporting frames disposed therein by means of a welding arrangement which comprises a plurality of pairs of welding dies which are disposed parallel to one another and are movable relative to one another in the longitudinal direction of the bellows, wherein the welding dies of the individual pairs of welding dies are simultaneously brought closer to one another in the longitudinal direction of the bellows and are jointly pressed in the direction of one another and thereby applied laterally to the outer pleats.

SUMMARY OF THE INVENTION

The object of the invention is to develop a bellows which can be produced in a particularly economical manner and in which, if required, the bellows body can also be coated with PVC if the supporting frames—as usual—are produced from rigid PVC. The invention should also provide an apparatus which facilitates particularly efficient welding of the outer pleats of the bellows body to the supporting frames disposed in these outer pleats.

This object is achieved according to the invention in that in the bellows the connection between the outer pleats of the bellows body and the supporting frames is formed by a high-frequency welded joint.

In contrast to the purely thermal welding process hitherto used exclusively in the production of bellows, in which the necessary welding heat is brought by heated welding dies to the material to be welded, in the production of the bellows according to the invention localised heating of the welding zone is achieved by means of a high-frequency welding arrangement. In this way—in contrast to the solution known from DE-C-32 25 369—it is also possible to coat the substrate material of the bellows body with PVC if the supporting frames are produced from rigid PVC. Since with high-frequency welding the welding heat necessary for welding the bellows body to the supporting frames is only generated in a locally precisely delimited welding zone with low three-dimensional expansion it is possible to prevent the outer surfaces which face one another of neighbouring outer pleats from being heated up to melting temperature and thus sticking together in an undesirable manner.

Therefore the carrier material of the bellows body of the bellows according to the invention can be coated with PVC, which makes possible a considerable decrease in cost relative to a coating with polyurethane (PU). It goes without saying, however, that if required the carrier material of the bellows body can also be coated with PU if this is desired for specific reasons.

Advantageously, the individual outer pleats of the bellows body are connected to the supporting frame disposed in the relevant outer pleat in each case by way of two weld seams which are disposed on different broad sides of this supporting frame near the outer edge of the supporting frame.

In this case the weld seams advantageously have a width of 2 to 6 mm, preferably 3 to 4 mm.

The high-frequency welding arrangement according to the invention for welding the outer pleats of the bellows body to the supporting frames disposed in these outer pleats is advantageously constructed so that in each case two neighbouring outer pleats of the bellows body can be simultaneously welded to the two supporting frames disposed therein.

In this case the high-frequency welding arrangement advantageously has a stationary central electrode which is connected to earth as well as two movable outer electrodes which are connected to a high-frequency source. In this case the central electrode is intended to engage in an inner pleat of the bellows body, whilst the two outer electrodes can be brought closer to the central electrode from opposite sides by movement parallel to the longitudinal axis of the bellows body and can be pressed with an adjustable pressure against the two neighbouring outer pleats. These outer pleats for their part are supported by the central electrode which is disposed between them.

A high-frequency welding arrangement constructed in this way is distinguished not only by a compact design and efficient operation, but it can also be operated in a stable manner without disruption.

For cyclical drawing near and distancing of the bellows relative to the high-frequency welding arrangement a cassette-type holder is advantageously provided.

BRIEF DESCRIPTION OF THE DRAWING

This and further details of the invention are the subject matter of the subordinate claims and are explained in greater detail in connection with an embodiment which is illustrated in the drawing. The single drawing FIGURE is a schematic partial longitudinal section of a high frequency welding system.

DETAILED DESCRIPTION

The apparatus which is illustrated quite schematically in the drawing in a partial longitudinal section serves for welding two neighbouring outer pleats 1, 2 of the bellows body 3 of a bellows 4 to the supporting frames 5, 6 disposed in these two outer pleats 1, 2.

The apparatus comprises a high-frequency welding arrangement with a central electrode 7 and two outer electrodes 8, 9. In this case the central electrode 7 is provided with a guide projection 10 which engages in the inner pleat 11 which lies between the two outer pleats 1 and 2.

The two outer electrodes 8, 9 can be brought nearer to the central electrode 7 from opposite sides by movement parallel to the longitudinal axis of the bellows body and can be pressed with adjustable pressure against the two neighbouring outer pleats 1, 2. In this case the two outer pleats 1 and 2 are supported by the central electrode 7 disposed between them and the guide projection 10 which is connected thereto.

The central electrode 7 is connected to earth, whilst the two movable outer electrodes 8 and 9 are connected to a high-frequency source (not shown).

A cassette-type holder (which is not illustrated in detail) serves for cyclical drawing near and distancing of the bellows relative to the high-frequency welding arrangement.

The drawing near of the bellows to the high-frequency welding arrangement and thus the depth of the engagement of the central electrode 7 and the guide projection 10 in the inner pleats 11 of the bellows body is delimited by a spacer 12.

A holder 11, which can consist for example of an adjustable guide rail and device for holding down, serves for positioning and fixing of the supporting frames 5, 6 which are to be inserted into the outer pleats 1, 2 of the bellows body.

The two outer electrodes 8 and 9 are advantageously actuated by a hydraulic drive arrangement.

Thus with the illustrated apparatus a plurality of pairs of pleats can be welded in succession in a cyclical process. It goes without saying that the apparatus could also be constructed so that individual neighbouring outer pleats can also be welded.

A control unit (which is not shown) has an interface by means of which the welding parameters can in each case be called up and stored as required by a PC.

The fabric film of the bellows body is coated as required with PVC or PU and generally has a thickness of 0.2 to 0.5 mm. The supporting frames to be welded into the outer pleats are advantageously produced from rigid PVC and have a thickness of 0.5 to 1.5 mm.

The welding pressure of the apparatus is advantageously infinitely variable by way of a synchronising arrangement. The closing and opening stroke of the outer electrodes as well as the welding pressure are advantageously adjustable.

The welding dies, i.e. the central electrode 7 and the outer electrodes 8 and 9, are so constructed that a high plane parallelism is guaranteed over the entire width of the apparatus (perpendicular to the drawing plane).

While a preferred embodiment of the invention has been disclosed herein, it will be apparent to those skilled in the art that variations and modifications of the invention can be made without departing from the spirit and scope of the invention as set forth in the following claims.

What is claimed is:

1. A bellows comprising:

a bellows body having outer pleats;

supporting frames forming a portion of the bellows body having lateral sides and edges each of the supporting frames connected to and extending from inside portions of the outer pleats by two weld seams which are disposed on lateral sides of the supporting frame near edges of the supporting frame which are adjacent the outer pleats; and a high-frequency welded joint forming the connections between the frames and the outer pleats.

2. The bellows as claimed in claim 1 wherein:

the weld seams have a width of 2 to 6 mm.

3. A high-frequency welding arrangement for welding outer pleats of a bellows body to edges of supporting frames disposed in the outer pleats wherein the bellows body has at least two outer pleats and the frame has at least two members with each member projecting into inside portions of the outer pleats, the apparatus comprising:

a grounded stationary central electrode;

two movable outer electrodes which are connected to a high-frequency source;

said central electrode being arranged and configured to engage in an inner pleat of the bellows body;

said two outer electrodes being arranged and configured to be brought closer to the central electrode from opposite sides of the central electrode by movement parallel to a longitudinal axis of the bellows body; and said two outer electrodes being arranged and configured to compress the outer pleats with an adjustable pressure while the outer pleats are supported by the central electrode disposed between the outer pleats;

so that two adjacent outer pleats of the bellows body are simultaneously welded to the supporting frames disposed in each said outer pleats.

4. An apparatus as claimed in claim 3, wherein the central electrode further comprises:

a guide projection which is constructed and arranged to engage inner pleats of the bellows body, wherein the inner pleats are disposed between and opposite to outer pleats of the bellows body.

5. An apparatus as claimed in claim 3 further comprising:

a pneumatic drive arrangement for actuating the two outer electrodes.

6. An apparatus as claimed in claim 3 further comprising:

means for spacing a distance between weld seams which connect adjacent outer pleats to the supporting frames; and means for adjusting a width of the weld seam spacing means for delimiting expansion and contraction of the bellows with respect to the high-frequency welding arrangement, thereby adjusting an engagement depth of the central electrode into an inner pleat of the bellows body, wherein an inner pleat is disposed between and opposite to the outer pleats.

7. An apparatus as claimed in claim 3 further comprising adjustable guide rails for holding down and for positioning and fixing the frames which are to be inserted into the outer pleats of the bellows body.

* * * * *